United States Patent Office
3,502,626
Patented Mar. 24, 1970

3,502,626
HIGH MOLECULAR WEIGHT CRYSTALLIZABLE COPOLYMERS OF CYCLOOLEFINS AND PROCESS FOR PREPARING SAME
Gino Dall'Asta, Giuseppe Motroni, and Giovanna Carella, Milan, Italy, assignors to Montecatini Edison S.p.A., Milan, Italy, a corporation of Italy
No Drawing. Filed July 12, 1967, Ser. No. 652,719
Claims priority, application Italy, July 15, 1966, 16,488/66
Int. Cl. C08f *17/00*
U.S. Cl. 260—80.78    17 Claims

ABSTRACT OF THE DISCLOSURE

This invention provides new random copolymers of unsubstituted cycloolefins of the formula

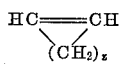

wherein $z$ is 2, 3, 5, 6, 7, 8, 9 or 10. The copolymers are crystalline at room temperature or crystallizable under stretching at room temperature or below, and may have a predetermined melting point adapting the same for particular uses. The copolymers are obtained by contacting a mixture of two or more cycloolefins, under polymerizing conditions, with a catalytic system obtained by mixing
  (a) A tungsten salt or mixture thereof with an aluminum halide;
  (b) An organometallic compound or hydride of aluminum, beryllium, magnesium, zinc or calcium; and
  (c) Optionally, a peroxidic compound or molecular oxygen.

---

Earlier applications of members of our group disclosed homopolymers of the cycloolefins which homopolymers have the structure of polyalkenamers corresponding to the general formula $$[-CH=CH-(CH_2)_z-]_n$$

wherein $z$ is an integer equal to 2, 3, 5, 6, 7, 8, 9 or 10 and $n$ represents the D.P. (mean degree of polymerization); and processes for obtaining the polyalkenamers by homopolymerizing the selected unsubstituted cycloolefin in contact with catalytic systems based on salts of transition metals of Groups IV–B and VI–B of the Mendeleev Periodic Table and organometallic compounds or hydrides of aluminum or the like.

Crystallizable copolymers of the cycloolefins have not been disclosed heretofore.

One object of this invention was to provide new copolymers of the cycloolefins.

This and other objects to appear hereinafter have been accomplished by the production of the present copolymers which while being random, are nevertheless crystalline at room temperature or crystallizable under stretching at room temperature or at temperatures not much below (5–10° C.) room temperature.

A crystallizable random copolymer is a phenomenon in the polymer arts. As is well known, the random distribution of units derived from two different monomers, along the polymeric chains, normally results in copolymers which are amorphous and noncrystallizable, even when the homopolymers of the respective monomers are crystallizable, due to the chemical disorder caused by the random succession of the units deriving from the different monomers along the polymeric chain.

Normally, only regularly alternating copolymers, or block copolymers, are crystallizable. In the former, the units deriving from the different starting comonomers alternate regularly along the polymeric chains. In block copolymers, long sequences of units deriving from one of the monomers are followed by long sequences of units deriving from another of the monomers. Steric regularity, as well as chemical regularity, is a requisite for crystallizability of either the homopolymers or copolymers.

The present copolymers are characterized in being
  (a) True copolymers the macromolecules of which are made up of units deriving from each of the starting monomers;
  (b) Copolymers in which single units of the starting monomers are randomly distributed in the copolymeric chain;
  (c) Sterically regular copolymers, in the sense that the double bonds present in the units deriving from the different starting monomers are at least prevailingly of trans type.

It is surprising, in view of characteristics (a) and (b), that the copolymers are crystallizable.

That the copolymers of this invention are true copolymers, and not mixtures of homopolymers of the respective monomers or mixtures of homopolymers and copolymers, is established by fractionating the copolymers, as by fractional precipitation from solution; by extraction with selected fractionation solvents; or by other fractionation techniques. It is found the fractions so obtained, while having molecular weights differing from other fractions and from the crude (total) copolymer, all comprise essentially the same percentage of units deriving from each of the starting monomers.

The structure of these random copolymers is also established by X-ray examination. Comparison of the X-ray diagrams of the copolymers, with those of homopolymers of the respective comonomers, shows that the reflections due to distances between the lattice planes crossing the polymeric chains of the copolymers are the same as in the diagrams for the homopolymers, while the lattice distances in the direction of the fiber axis which are detectable in the diagrams for the homopolymers are absent from, or appear only weakly in, the diagrams for the copolymers.

In the cycloolefins two or more of which are copolymerized to obtain the present random, crystallizable copolymers, the double bond may have cis or trans configuration. Mixtures of the cis-form of a given cycloolefin with the same cycloolefin in trans-form may be used. All combinations of cycloolefins having the formula

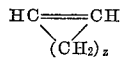

wherein $z$ is 2, 3, 5, 6, 7, 8, 9 or 10, may be employed in all relative molar ratios.

However, to obtain the crystallizable random copolymers it is essential to effect the copolymerization by means of selected catalytic systems which exhibit specificity for copolymerizing the starting monomers to copolymers in which at least the prevailing (over 60%) proportion of the double bonds are of trans type.

These random, crystallizable copolymers have melting points which are lower than the melting points of the crystallizable homopolymers of the respective monomers. The difference in the melting points varies and may be a difference of some degrees centigrade or of some ten degrees, depending on the overall relative proportions of the comonomers in the copolymer.

An important facet of the invention is the possibility of predetermining the melting point of the copolymer produced by selection of the particular starting monomers and the relative proportions thereof. This is very advantageous when it is desired to produce a copolymer which is tailored to a specific use, for example to use as an elastomer.

Polymers of given chemical structure and useful in the elastomers field have the best elastomeric properties when the melting point is close to room temperature. In general, polymers which are amorphous at room temperature but crystallize at room temperature when stretched, make the best elastomers.

By the present invention, it is possible to obtain copolymers which have a predetermined melting point close to room temperature and which crystallize under stretching at room temperature or slightly below, and which have maximum elastomeric properties.

In the copolymers of the invention, essentially all of the units deriving from the different unsubstituted cycloolefins have the structure of alkenamers, as shown by the fact that each of said units, as it exists in the copolymeric chain, contains a free double bond. At least a prevailing proportion of those double bonds has trans configuration.

The composition of the copolymers can be determined by using, as one starting comonomer, a radioactivity-labelled cycloolefin. This was done in carrying out the examples given below. It is to be noted that the only reason for using the radioactively-labelled cycloolefin was to facilitate determination of the copolymer composition.

Catalytic systems which exhibit specificity for copolymerization of the unsubstituted cycloolefins to the random, crystallizable copolymers in which the double bonds have, prevailingly, trans structure, are obtained, as indicated above, by mixing certain tungsten salts with organometallic compounds or hydrides of Al, Be, Mg, Zn and Ca. As also indicated in the foregoing "Abstract of Invention," oxygenated compounds, i.e., peroxidic compounds and molecular oxygen may be used in preparing the catalyst systems. Such use is optional but has the desirable advantage of improving the copolymerization rate.

Examples of the tungsten salts which are useful as one catalyst-forming component include tungsten hexachloride, tungsten pentachloride, tungsten pentabromide, tungstyl tetrachloride, tungsten dioxy dichloride, and tungsten dichloride. Mixtures of the tungsten salts with aluminum halides, such as e.g., $3WCl_2+4AlCl_3$, which can be obtained by reduction of $WCl_6$ with stoichiometric amounts of aluminum metal, can also be used. In general, combinations of tungsten salt and aluminum halide in a molar ratio comprised between 100:1 and 1:5, preferably between 100:1 and 1:2 can be used.

Examples of the organometallic compounds or hydrides useful as catalyst-forming component include: aluminum triethyl, aluminum tri-isobutyl, aluminum tri-n-hexyl, aluminum triphenyl, diethyl aluminum chloride, diethyl aluminum bromide, diethyl aluminum fluoride, ethyl aluminum dichloride, di-isobutyl aluminum hydride, aluminum hydride, diethyl aluminum ethoxide, diethyl beryllium, diethyl magnesium, diphenyl magnesium, ethyl magnesium bromide, diethyl zinc, di-n-butyl zinc, ethyl zinc bromide, ethyl calcium hydride. Particularly satisfactory results are obtained by using aluminum trialkyls, dialkyl aluminum chlorides, and alkyl aluminum dichlorides, such as $Al(C_2H_5)_3$; Al $(i-C_4H_9)_3$; $Al(C_2H_5)_2Cl$; and $AlC_2H_5Cl_2$.

The molar ratio of tungsten salt to organometallic compound or hydride may vary. In general, molar ratios in the range 1:0.5 to 1:100 may be used. When aluminum trialkyls or beryllium dialkyls are used as one catalyst-forming component, the preferred tungsten salt to $AlR_3$ or $BeR_2$ molar ratio is in the range 1:1 to 1:5, whereas when using hydrides or alkylhydrides of the specified metals, the preferred tungsten salt to hydride or alkylhydride molar ratio is in the range 1:3 to 1:20.

Oxygenated compounds containing an oxygen-to-oxygen bond, which can be used, optionally, as additional catalyst-forming component, include dialkyl peroxides, diaryl peroxides, diacylperoxides, alkylhydroperoxides, arylalkyl-hydroperoxides, peracids and esters thereof, peroxides of ketones, aldehydes and acetals, hydrogen peroxide and molecular oxygen.

Specific examples of the useful oxygenated compounds include benzoyl peroxide, di-tert.butyl peroxide, dicumylperoxide, tert. butylhydroperoxide, cumene hydroperoxide, peracetic acid, p-chlorobenzoyl peroxide, cyclohexanone peroxide and hydrogen peroxide.

The molar ratio between the tungsten salt and oxygenated compound can be in the range 1:2 to 1:0.1. A presently preferred molar ratio is 1:0.5.

The molar ratio of the tungsten salt to monomer is suitably selected to be in the range 1:50 to 1:10,000. The presently preferred molar ratios are in the range 1:200 to 1:3,000.

The order in which the catalyst-forming components are mixed together can be varied. However, it is preferable to avoid adding the oxygenated compound to the organometallic compound or hydride, either as such as diluted in the monomers.

The preferred practice is to bring the reactants into contact in the following order: mixed monomers, oxygenated compound, tungsten salt (or mixture thereof with aluminum halide), organometallic compound or hydride, the organometallic compound or hydride being added after the mixture of monomers, oxygenated compound and tungsten salt has been brought to copolymerization temperature.

The copolymerization can be carried out in an inert diluent which may be an aliphatic, cycloaliphatic, aromatic, or ar-aliphatic hydrocarbon solvent such as, for instance, toluene, n-heptane, or cyclohexane. Mixtures of the solvents of the mentioned types may be used.

Very satisfactory results are obtained, also, by effecting the copolymerization in the absence of a solvent or extraneous diluent.

Copolymerization temperatures of from $-80°$ C. to $60°$ C. may be used, generally speaking. In presently preferred embodiments, the copolymerization is carried out at the temperature of from $-50°$ C. to $50°$ C.

The random, crystallizable copolymers of the invention are soluble in aromatic and chlorinated hydrocarbon solvents, and are insoluble, or only slightly soluble, in alcohols, aliphatic ketones and aliphatic ethers.

The copolymers have high average molecular weights corresponding to intrinsic viscosities in toluene between 0.3 and 10 dl./g.

The copolymers occur as colorless solids or semisolids having a fibrous or rubber-like appearance. They can be used in the fields of elastomers, rubbers, expanded masses, and thermosetting resins.

The following examples are nonlimiting, being given to illustrate the invention.

EXAMPLE 1

In a 100-ml. reactor, provided with stirrer and nitrogen inlet tube, air is replaced with dry nitrogen. 5.0 ml. (56 millimols) of cyclopentene, 5.0 ml. (43 millimols) of cycloheptene and 0.2 millimol of benzoylperoxide are then introduced.

After some minutes of stirring the whole is cooled to $-30°$ C. and 79.5 mg. (0.2 millimol) of $WCl_6$ powder and successively 0.13 ml. (1.0 millimol) of diethylaluminum monochloride are added.

The polymerization is allowed to proceed by keeping the mass in agitation for 2 hours at $-30°$.

The polymerization is stopped by addition of 100 ml. of methanol containing 5 ml. of 35% hydrochloric acid. The coagulated copolymer is isolated and purified by dissolving it in 100 ml. of benzene containing 50 mg. of phenyl-beta-naphthylamine and pouring the solution into 500 ml. of methanol. The copolymer, dried under vacuum at room temperature, weighs 3.2 g. (corresponding to a conversion of 40%, referred to the sum of the two monomers).

It has the appearance of a colorless elastic solid. From the radiochemical analysis, carried out on a sample containing units derived from cyclopentene marked with tritium, the copolymer has a composition corresponding to 80% by mols of units derived from cyclopentene and 20% by mols of units derived from cycloheptene. The monomeric units are present in the copolymer in the form of pentenamer [—CH=CH—$(CH_2)_3$—], and of heptenamer [CH=CH—$(CH_2)_5$—], respectively. The double bonds are for 75% of trans type and for 25% of cis type.

The copolymer crystallizes when subjected to stretching. That it has in fact the structure of a crystallizable copolymer, and not of a mixture of homopolymers, is supported by the following facts:

(a) The chemical composition of the copolymer does not vary appreciably in the various fractions obtained by fractional precipitation of the total copolymer;

(b) The X-ray examination shows regularity of structure in lattice planes crossing the chains but not along the axis of the same chains; the units of trans pentenamer and of trans heptenamer are therefore distributed along the same chains.

The intrinsic viscosity in toluene at 30° C. is 2.7 dl./g.

The copolymer is soluble at room temperature in aromatic solvents (e.g., benzene), and chlorinated solvents (e.g., chloroform); it is insoluble in alcohols (e.g., methanol) and ketones (e.g., acetone).

It is vulcanizable with recipes on the basis of sulfur and accelerators.

EXAMPLE 2

The following reactants are introduced into an apparatus such as that described in Example 1 and with the same modalities: 0.88 ml. (10 millimols) of cyclopentene, 10.5 ml. (90 millimols) of cycloheptene, 0.2 millimol of benzoyl peroxide, 79.5 mg. (0.2 millimol) of $WCl_6$ powder and finally 0.13 ml. (1.0 millimol) of aluminum diethyl monochloride. The polymerization temperature is —30° C., the duration 7 hours.

The copolymer is isolated and purified as in Example 1; the dried copolymer is a colorless elastic solid. It weighs 0.65 g. (conversion of 7% referred to the two monomers). From the radiochemical analysis, the copolymer consists of 65% by mols of units derived from cyclopentene and of 35% by mols of units derived from cycloheptene. The monomeric units are present in the copolymer in the form of pentenamer and of heptenamer, respectively. The double bonds are for 75% of trans type and for 25% of cis type. The units of pentenamer and of heptenamer are distributed at random along the polymeric chains.

The copolymer shows properties similar to those of the copolymer of Example 1. It crystallizes when subjected to stretching.

EXAMPLE 3

The following reactants are introduced into an apparatus such as that described in Example 1 and with the same modalities: 17.3 ml. (132 millimols) of cis cyclooctene (tritiated); 8.5 ml. (44 millimols) of cyclododecene (mixture of cis and trans isomers in the ratio of 1:2); 96 mg. (0.35 millimol) of dicumyl peroxide; 120 mg. (0.35 millimol) of $WCl_4$. The whole is agitated for some minutes and, after cooling to —20° C., 0.1 ml. (0.87 millimol) of aluminum diethyl monochloride are added.

The reaction mixture is initially agitated at —20° C. for 1 hour and then at +50° C. for 2 hours and a half. The copolymer is isolated and purified as in Example 1. The dried copolymer is a nontacky white solid. It weighs 11.6 g. (conversion of 53% referred to the two monomers). From the radiochemical analysis, the copolymer consists of 75% by mols of units derived from cyclooctene and 25% of units derived from cyclododecene. The monomeric units are present in the copolymer in the form of octenamer [—CH=CH—$(CH_2)_6$—] and dodecenamer [—CH=CH—$(CH_2)_{10}$—], respectively. The double bonds are for 81% of the trans type and for 19% of the cis type. The octenamer and dodecenamer units are distributed at random along the polymeric chains. The copolymer has an intrinsic viscosity in toluene at 30° C. of 2.3 dl./g. It is soluble in aromatic hydrocarbons (e.g., benzene) and chlorinated hydrocarbons (e.g., chloroform); insoluble or scarcely soluble in alcohols (e.g., methanol), ketones (e.g., acetone), ethers (e.g., diethyl ether).

It is crystalline at room temperature. Its melting point is 43° C. (in contrast to a melting point of 67° C. for the homopolymer having the structure of trans polyoctenamer).

The crystallinity at room temperature can be eliminated by extension with mineral oil (10–20% by weight) of aromatic type or by vulcanization with recipes on the basis of sulfur and accelerators. Although such a vulcanized product is not crystalline in a state of rest at room temperature, it retains its capacity of crystallizing when subjected to stretching.

The copolymer obtained according to the above procedure was vulcanized using the following recipe:

| | Parts per weight |
|---|---|
| Above copolymer | 100 |
| Carbon black type HAF ("High Abrasion Furnace") | 50 |
| Sulphur | 1 |
| Accelerator cyclohexylbenzothiazilsulphonamide | 1 |
| Phenyl-beta-naphthylamine (antioxidant) | 1 |
| Stearic acid | 2 |
| Zinc oxide | 5 |

Vulcanization conditions: 40 minutes at 150° C.

Properties of the vulcanized copolymer:

Tensile strength—238 kg./cm.$^2$
Elongation to break—300%.
Elasticity modulus at 200% elongation—128 kg./cm.$^2$
Permanent set at break—4%.

EXAMPLE 4

The following reactants are introduced with the same modalities into an apparatus such as that described in Example 1: 18.6 ml. (142 millimols) of cis cyclooctene (tritiated); 1.4 ml. (7.2 millimols) of cyclododecene (mixture of cis and trans isomers in the ratio of 1:2) 85 mg. (0.31 millimol) of dicumylperoxide, 105 mg. (0.31 millimol) of $WOCl_4$; 0.093 ml. (0.77 millimol) of diethylaluminium monochloride.

The reaction mixture is kept in agitation initially at —20° C. for 1 hour and is then slowly heated to +50° C. After 3 hours and a half, the polymerization is stopped by addition of methanol and the copolymer is isolated and purified as in Example 1.

7.8 g. of a white solid copolymer, having an appearance and properties similar to those of the product described in the preceding example are obtained (with a conversion of 50% in respect of the sum of two monomers).

From the radiochemical analysis, the copolymer consists of 85% by mols of units derived from cyclooctene and 15% by mols of units derived from cyclododecene; the monomeric units are present in the copolymer in the form of octenamer (—CH=CH—$(CH_2)_6$—) and dodecenamer (—CH=CH—$(CH_2)_{10}$—), respectively, and are distributed at random along the polymeric chains.

The double bonds are for 81% of the trans type and 19% of cis type; the intrinsic viscosity of the copolymer in toluene at 30° C. is 2.1 dl./g.

Its characteristics of solubility and crystallinity, as well as the possibility of eliminating the crystallinity by extension with mineral oil or vulcanization are the same as those of the copolymer described in Example 3; its melting point is 43° C.

EXAMPLE 5

The copolymerization of cis cyclooctene and cyclopentene is carried out as and under the conditions described in Example 1, by using the following reactants: 18 ml. (140 millimols) of cis cyclooctene (tritiated); 1.4 ml. (16 millimols) of cyclopentene; 84 mg. (0.31 millimol) dicumyl peroxide, 105 mg. (0.31 millimol) of WOCl₄; 0.093 ml. (0.77 millimol) of diethyl aluminium monochloride. The temperature of the reaction mixture is −20° C. for 1 hour and is then slowly brought to +50° C.

After 10 hours, the polymerization is stopped by the addition of methanol and the copolymer is isolated and purified as described in Example 1. The copolymer thus obtained is solid, white, non-tacky and weighs 8.9 g. (conversion of 55% in respect of the sum of the two monomers). As can be deduced from the measure of its specific gravity, the copolymer consists of 90% of units derived from cyclooctene and 10% of units derived from cyclopentene; these units are octenameric $$(-CH=CH-(CH_2)_6-)$$

and pentenameric ($-CH=CH-CH_2)_3-$), respectively, and are distributed at random along the polymeric chain. By examination of the infrared spectrum it has been observed that the double bonds are for 25% of cis type and for 75% of trans type. The intrinsic viscosity of the copolymer (in toluene at 30° C.) is 1.8 dl./g. It melts at 45° C.; it is soluble in the cold in aromatic solvents (e.g., benzene, toluene) and chlorinated solvents (e.g., chloroform), and insoluble in ketones (e.g., acetone) and alcohols (e.g., methanol).

The copolymer, analogously with the copolymer described in Example 3, is crystalline at room temperature. The crystallinity can be eliminated by extension with mineral oil (1–20% by weight) or by vulcanization with recipes on the basis of sulfur and accelerators. The vulcanized product thus obtained is not crystalline when it is at rest at room temperature but retains the capacity of crystallizing under stretch.

EXAMPLE 6

The following reactants are introduced into an apparatus and with the modalities described in Example 1: 15.5 ml. (120 millimols) of cis cyclooctene (tritiated); 3.5 ml. (40 millimols) of cyclopentene, 85 mg. (0.32 millimol) of dicumyl peroxide; 108 mg. (0.32 millimol) of WOCl₄; 0.016 ml. (0.79 millimol) of diethyl aluminum monochloride.

The polymerization is carried out for 1 hour at −20° C. and then for 24 hours at +50° C. and for 47 hours at room temperature. It is then stopped and the copolymer is isolated and purified as described in Example 1. 3.7 g. (conversion of 50% is respect of the sum of the two monomers) of a soft whitish copolymer are obtained. It melts at a temperature about 10–20° C. below room temperature but crystallizes even at room temperature when subjected to stretching. Its intrinsic viscosity corresponds to 0.8 dl./g. (in toluene at 30° C.). From the radiochemical analysis, it can be said that the monomeric units derive for 80% from cyclooctene and for 20% from cyclopentene. They are distributed at random along the polymeric chains. These units are octenameric $$(-CH=CH-(CH_2)_6)$$

and pentenameric ($-CH=CH-(CH_2)_3$), respectively.

The double bonds are for 20% of cis type and for 80% of trans type.

The copolymer can be vulcanized with recipes on the basis of sulfur and accelerators.

EXAMPLE 7

The following reactants are introduced into an apparatus such as that described in Example 1 and under the same conditions: 18 ml. (140 millimols) of cis cyclooctene (tritiated); 1.8 ml. (15 millimols) of cycloheptene; 86 mg. (0.32 millimol) of dicumyl peroxide; 109 mg. (0.32 millimol) of WOCl₄; 0.096 ml. (0.8 millimol) of diethyl aluminium monochloride. The reaction mixture is kept for 1 hour at −20° C. and then for 6 hours at +50° C. The polymerization is then stopped and the copolymer is isolated and purified as described in Example 1. The copolymer thus obtained weighs 9.5 g. (conversion of 57% in respect of the sum of the two monomers); it is a white solid and consists of 90% of units deriving from cyclooctene and 10% of units derived from cycloheptene (on basis of the radiochemical analysis).

The monomeric units are of the octenameric type ($-CH=CH-(CH_2)_6$) and heptenameric $$(-CH=CH-(CH_2)_5-)$$

respectively, and are distributed at random along the copolymer chain.

Examination of the infrared absorption spectrum shows that 76% of the double bonds are of the trans type and 24% are of the cis type. The melting point is 45° C. and the intrinsic viscosity (in toluene at 30° C.) is 2.6 dl./g.

The copolymer has properties similar to those of the products described in Examples 3 and 5; it is also soluble in aromatic and chlorinated solvents and insoluble in alcohols and ketones; it is crystalline at room temperature but the crystallinity can be eliminated by extension with oils of aromatic type or by vulcanization; in this last case a vulcanized product which is still capable of crystallizing under stretch is obtained.

EXAMPLE 8

Cis-cyclooctene and cycloheptene are copolymerized as and under the conditions described in Example 1, by using the following reactants: 15 ml. (120 millimols) of cyclooctene (tritiated); 4.5 ml. (39 millimols) of cycloheptene; 86 mg. (0.32 millimol) of dicumyl peroxide; 109 mg. (0.32 millimol) of WOCl₄; 0.096 ml. (0.8 millimol) of diethyl aluminium monochloride.

The reaction mixture is kept in agitation first at −20° C. for 1 hour, then at +50° C. for 22 hours.

The polymerization is stopped and the copolymer is isolated and purified as described in Example 1.

After drying, the copolymer weighs 10.6 g. (conversion of 65% in respect of the sum of the two monomers). It is a white solid which melts at 37° C. and has an intrinsic viscosity (in toluene at 30° C.) of 1.8 dl./g. The monomeric units (as can be stated on basis of the radiochemical analysis) derive for 80% from cyclooctene and for 20% from cycloheptene; they are of the octenameric ($-CH=CH-(CH_2)_6-$) and heptenameric $$(-CH=CH-(CH_2)_5-)$$

type, respectively, and are distributed at random along the polymeric chains.

The copolymer is similar to the product described in Example 7 as regards the characteristics of solubility in aromatic and chlorinated solvents and of insolubility in alcohols and ketones and in being crystalline at room temperature. The crystallinity can be eliminated as described in Example 7.

Changes in details can be made in practicing the invention without departing from the spirit thereof. Therefore, we intend to include in the scope of the appended claims all variations and modifications as will be obvious to those skilled in the art from the description and illustrative working examples given herein.

What is claimed is:

1. High molecular weight, crystallizable, unsaturated, linear, random copolymers of unsubstituted cycloolefins, said copolymers being characterized in consisting essentially of monomeric units of the type $$-\left[CH=CH-(CH_2)_z\right]- \text{ and } -\left[CH=CH-(CH_2)_{z_1}\right]-$$

in which $z$ and $z_1$ are different from each other and represent an integer equal to 2, 3, 5, 6, 7, 8, 9 and 10, and in that prevailingly (more than 60%) trans double bonds are present in the copolymer main chain.

2. Copolymers according to claim 1, characterized in being normally crystalline at room temperature.

3. Copolymers according to claim 1, characterized in being normally amorphous at room temperature but crystallizable at said temperature under stretching.

4. Cyclopentene-cycloheptene copolymers according to claim 1.

5. Cyclooctene-cyclododecene copolymers according to claim 1.

6. Cyclopentene-cyclooctene copolymers according to claim 1.

7. Cycloheptene-cyclooctene copolymers according to claim 1.

8. Process for the copolymerization of at least two cycloolefins having the formula

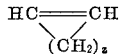

in which z represents an integer selected from 2, 3, 5, 6, 7, 8, 9 and 10, being different in each of the cycloolefins used, and in which the double bonds have either cis or trans configuration, said process being characterized in that a mixture of the different cycloolefins is contacted, under copolymerization conditions, with a catalytic system obtained by mixing:
  (a) a catalyst-forming component selected from the group consisting of tungsten salts and mixtures thereof with aluminum halides, the W/Al molar ratio being comprised between 100:1 and 1:5, preferably between 100:1 and 1:2.
  (b) a catalyst-forming component selected from the group consisting of organometallic compounds and hydrides of aluminum, beryllium, magnesium, zinc and calcium; and
  (c) optionally, a substance selected from the group consisting of peroxidic compounds and molecular oxygen.

9. The process according to claim 8, characterized in that the catalytic system is obtained by mixing:
  (a) a compound of the type $AlR_nCl_m$ in which R represents a hydrocarbon group, $n$ represents an integer from 1 to 3, inclusive; and $m$ represents a value from 0 to 2 inclusive; the sum $n+m$ being equal to 3;
  (b) a tungsten salt selected from the group consisting of $WCl_6$, $WCL_5$, $WBr_5$, $WOCl_4$, $WO_2Cl_2$, $WCl_2$ and the complex $(3WCl_2+4AlCl_3)$;
  (c) an oxygenated compound selected from the group consisting of benzoyl peroxide and dicumyl peroxide.

10. The process according to claim 9, characterized in that (a) is $Al(C_2H_5)_2Cl$.

11. The process according to claim 10, characterized in that (b) is $WCl_6$.

12. The process according to claim 9, characterized in that (b) is $WOCl_4$.

13. The process according to claim 7, characterized in that the molar ratio (b):(a) is comprised between 1:0.5 and 1:100.

14. The process according to claim 7, characterized in that the molar ratio (b):(c) is comprised between 1:2 and 1:0.1, preferably 1:0.5.

15. The process according to claim 7, characterized in that the molar ratio (b):monomers is comprised between 1:50 and 1:10,000, preferably between 1:200 and 1:3,000.

16. The process according to claim 7, characterized in that the copolymerization is carried out at a temperateure comprised between —80° and +60° C., preferably between —50° and +50° C.

17. Copolymers according to claim 1, sulfur-vulcanized to elastomers.

References Cited

Natta, G., et al.: Die Makromolekulare Chemie, vol. 69, pp. 163–179, "Stereospecific Polymerization of Cyclobutene."

Natta, G., et al.: Die Makromolekulare Chemie, vol. 91, pp. 87–106, "Stereospecific Ring Cleavage Homopolymerization of Cycloolefins and Structural Examination of the Resulting Homologous Series of Linear Crystalline trans Polyalkenamers."

JOSEPH L. SCHOFER, Primary Examiner

R. S. BENJAMIN, Assistant Examiner

U.S. Cl. X.R.
260—79.5, 88.2, 785